US011812360B2

(12) United States Patent
Tao et al.

(10) Patent No.: US 11,812,360 B2
(45) Date of Patent: Nov. 7, 2023

(54) METHOD AND APPARATUS FOR COMMUNICATION BETWEEN A TERMINAL AND A BASE STATION

(71) Applicant: ALIBABA GROUP HOLDING LIMITED, Grand Cayman (KY)

(72) Inventors: Zhen Tao, Hangzhou (CN); Xiaobo Yu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 206 days.

(21) Appl. No.: 17/368,113

(22) Filed: Jul. 6, 2021

(65) Prior Publication Data
US 2021/0336722 A1 Oct. 28, 2021

Related U.S. Application Data

(63) Continuation of application No. PCT/CN2020/070050, filed on Jan. 2, 2020.

(30) Foreign Application Priority Data

Jan. 3, 2019 (CN) .......................... 201910005659.9
Jan. 22, 2019 (CN) .......................... 201910059207.9

(51) Int. Cl.
*H04B 7/155* (2006.01)
*H04L 1/00* (2006.01)
(Continued)

(52) U.S. Cl.
CPC ........ *H04W 40/24* (2013.01); *H04B 7/15507* (2013.01); *H04L 1/1657* (2013.01);
(Continued)

(58) Field of Classification Search
CPC ........ H04B 1/69–719; H04B 7/02–216; H04B 17/40–409; H04L 1/12–1896;
(Continued)

(56) References Cited

U.S. PATENT DOCUMENTS

2012/0218926 A1* 8/2012 Wang .................. H04W 40/005

FOREIGN PATENT DOCUMENTS

CN 105554863 A * 5/2016 ............ H04W 40/22
CN 105554863 A 5/2016
(Continued)

OTHER PUBLICATIONS

PCT International Search Report and Written Opinion dated Apr. 1, 2020, issued in corresponding International Application No. PCT/US2020/070050 (12 pgs.).

*Primary Examiner* — Timothy J Weidner
(74) *Attorney, Agent, or Firm* — Finnegan, Henderson, Farabow, Garrett & Dunner, LLP

(57) ABSTRACT

Embodiments of the present disclosure provide methods and devices for communication by a terminal. The method can include: sending, by the terminal, a first data frame to a relay device in a first mode, the first data frame comprising a first preamble and a first message information set, and the first preamble being used to wake up the relay device; sending, by the terminal, a second data frame to the relay device in the first mode, the second data frame comprising a second preamble and a second information set, the second data frame being sent after the terminal has sent the first data frame and a first time interval has elapsed, and the length of the second preamble being less than that of the first preamble; and receiving, by the terminal, a third data frame sent by the relay device in the first mode, the third data frame being sent to the terminal after being received from the base station by the relay device.

20 Claims, 9 Drawing Sheets

(51) Int. Cl.
  *H04L 1/16* (2023.01)
  *H04W 12/00* (2021.01)
  *H04W 12/106* (2021.01)
  *H04W 12/61* (2021.01)
  *H04W 40/22* (2009.01)
  *H04W 40/24* (2009.01)
  *H04W 56/00* (2009.01)
  *H04W 74/00* (2009.01)
  *H04W 76/15* (2018.01)
  *H04W 84/04* (2009.01)
  *H04W 88/02* (2009.01)
  *H04W 88/08* (2009.01)
  *H04W 92/02* (2009.01)
  *H04W 92/10* (2009.01)
  *H04L 1/1607* (2023.01)

(52) U.S. Cl.
  CPC ....... *H04W 12/009* (2019.01); *H04W 12/106* (2021.01); *H04W 12/61* (2021.01); *H04W 40/22* (2013.01); *H04W 40/248* (2013.01); *H04W 56/0055* (2013.01); *H04W 74/002* (2013.01); *H04W 76/15* (2018.02); *H04L 2001/0097* (2013.01); *H04W 84/047* (2013.01); *H04W 88/02* (2013.01); *H04W 88/08* (2013.01); *H04W 92/02* (2013.01); *H04W 92/10* (2013.01); *Y02D 30/70* (2020.08)

(58) Field of Classification Search
  CPC ..... H04L 2001/0092–0098; H04L 63/04–205; H04W 12/009–80; H04W 28/02–26; H04W 36/0005–385; H04W 40/005–38; H04W 48/02–20; H04W 56/0005–0095; H04W 60/005–06; H04W 74/002–0891; H04W 76/10–50; H04W 84/02–16; H04W 88/02–16; H04W 92/02–24; Y02D 30/70
  See application file for complete search history.

(56) References Cited

FOREIGN PATENT DOCUMENTS

| CN | 105992143 | A | | 10/2016 | |
|---|---|---|---|---|---|
| CN | 107347177 | A | | 11/2017 | |
| CN | 107872839 | A | | 4/2018 | |
| CN | 107769834 | B | * | 5/2020 | ............ H04W 40/22 |
| WO | WO 2015/005675 | A1 | | 1/2015 | |
| WO | WO2020140930 | A1 | | 7/2020 | |

* cited by examiner

| First time interval information | Security mechanism indicator | Encapsulation indiactor | Spreading factor indication information | Terminal identifier | Count value | First verification information | Second verification information |
|---|---|---|---|---|---|---|---|

FIG. 9

METHOD AND APPARATUS FOR COMMUNICATION BETWEEN A TERMINAL AND A BASE STATION

CROSS-REFERENCE TO RELATED APPLICATION

The present disclosure claims the benefits of priority to International Application No. PCT/CN2020/070050, filed on Jan. 2, 2020, which claims priority to Chinese Patent Application No. 201910005659.9 filed on Jan. 3, 2019, and claims priority to Chinese Patent Application No. 201910059207.9 filed on Jan. 22, 2019, all of which are incorporated herein by reference in their entireties.

BACKGROUND

Internet of Things technology is the third information technology revolution after computers and the Internet. Advantages of Internet of Things technologies include real-time performance and interactivity. The Internet of Things technologies have been widely used in various fields such as urban management, digital homes, positioning and navigation, logistics management, and security systems. Long Range (LoRa) is a low-power long-distance wireless transmission scheme based on a spread spectrum technology. The characteristics of LoRa include long transmission distance, low power consumption, multiple nodes, and low cost.

A LoRa network usually includes a terminal, a base station, and a server. An uplink signal of the terminal is directly received by the base station, and a downlink signal of the base station is also directly received by the terminal. However, in some cases, signals of the base station and the terminal cannot reach each other due to attenuation. For example, if the terminal is installed underground, the signal strength can be attenuated, causing difficulties for the base station and the terminal to communicate.

SUMMARY

Embodiments of the present disclosure provide methods and devices for communication by a terminal. The method can include: sending, by the terminal, a first data frame to a relay device in a first mode, the first data frame comprising a first preamble and a first message information set, and the first preamble being used to wake up the relay device; sending, by the terminal, a second data frame to the relay device in the first mode, the second data frame comprising a second preamble and a second information set, the second data frame being sent after the terminal has sent the first data frame and a first time interval has elapsed, and the length of the second preamble being less than that of the first preamble; and receiving, by the terminal, a third data frame sent by the relay device in the first mode, the third data frame being sent to the terminal after being received from the base station by the relay device.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings:

FIG. 9 is a message structure diagram of an exemplary first message set, consistent with some embodiments of the present disclosure.

DETAILED DESCRIPTION

Figure 1:
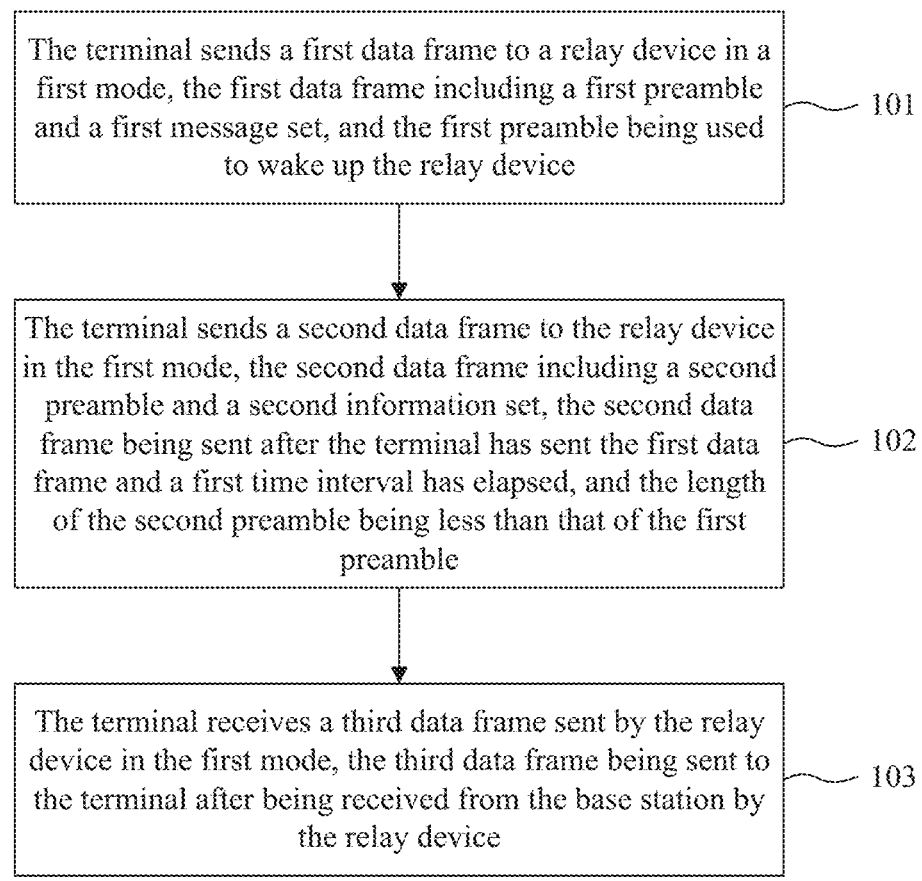
FIG. 1 is a flow chart of exemplary method for communication by a terminal, consistent with some embodiments of the present disclosure.

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

A LoRa network is composed of a terminal node, a base station node, and a server. A terminal has a LoRa network connection capability and joins the LoRa network. According to different application scenarios where the LoRa network is deployed, the terminal can include different electronic devices. For example, when the LoRa network is applied to city management, the terminal can include a smart meter; when the LoRa network is applied to a digital home, the terminal can include various smart home appliances, and so on.

A base station, also referred to as a gateway or a concentrator in the LoRa network, has the function of wireless connection convergence, including providing the terminal with an access to the LoRa network, forwarding data from the server or the terminal, and achieving data interaction between the terminal and the server. The base station can also conduct data interaction with other base stations within a signal coverage area of the base station by transmitting radio frames.

The server can include a server or a server cluster, which is used to perform service processing according to data obtained from the base station or the terminal and to control a working mode and a working state of the base station or the terminal.

As described, signal strength can be attenuated, e.g., when the terminal is installed underground. To address the problems associated with the signal strength attenuation, embodiments of the present disclosure provide a LoRa relay device between a terminal and a base station, and establish communication between the terminal and the base station through the LoRa relay device. Specifically, a terminal can send a join request frame with a first preamble to a relay device, the relay device can forward the join request frame to a base station, and then the relay device can send a join response frame returned by the base station to the terminal, thereby completing a join process of the terminal. After the terminal joins a network through the relay device, the terminal can send an uplink data frame with the first preamble to the relay device, the relay device can forward the uplink data frame to the base station, and then the relay device can send a downlink data frame returned by the base station to the terminal, thereby completing the process of communication between the terminal and the base station. The terminal can join a network through the relay device and communicate with the base station. A LoRaWAN radio frame format of the terminal is not changed, and only the length of the preamble is increased. Such relay devices do not use a private frame structure, but are highly compatible with a LoRaWAN standard, which provides a guarantee for manufacturers to unify a LoRa relay standard.

Firstly, a process of communication between a terminal and a base station is introduced below from the perspective of the terminal.

FIG. 1 is a flow chart of exemplary method for communication by a terminal, consistent with some embodiments of the present disclosure. The method can specifically include the following steps.

In step 101, the terminal sends a first data frame to a relay device in a first mode, the first data frame including a first preamble and a first message set, and the first preamble being used to wake up the relay device.

In a standard join process, the terminal will send a join request frame with a second preamble to the base station. If the terminal can receive a join response frame returned by the base station, the standard join succeeds.

However, when mutual signal strengths between the terminal and the base station is insufficient, the join request frame sent by the terminal cannot reach the base station, or the join response frame returned by the base station cannot reach the terminal, then the standard join fails.

In the embodiments of this disclosure, a LoRa relay device is provided between the terminal and the base station, and the communication between the terminal and the base station can be established through the relay device.

For example, the terminal is buried underground and 500 meters away from the base station. If the terminal is unable to receive a base station signal due to ground obstacles, the relay device can be placed above the ground of a buried point of the terminal to play the role of signal relay.

In the embodiments of this disclosure, as a standard node, the relay device first joins the LoRa network according to the standard join process. That is, the relay device firstly sends a join request frame with a second preamble to the base station, and then receives a join response frame returned by the base station. After the standard join succeeds, the relay device enters an intermittent sleeping state to reduce power consumption.

When the standard join process of the terminal fails, the terminal can send a join request frame with a first preamble to the relay device that has already joined the network.

The preamble is a regular wireless signal for notifying a wireless receiver that the following wireless signal contains valid information.

In the embodiments of this disclosure, the second preamble and the first preamble are both wireless signals preceding the join request frame.

The second preamble is a standard preamble, which is a preamble in a standard format specified by a LoRaWAN protocol. The first preamble is a long preamble, the length of the first preamble being greater than that of the second preamble. The length of a preamble can include a duration.

Another purpose of the first preamble is to activate a sleeping wireless receiver, so the length of the first preamble is greater than that of the second preamble. For example, a sleeping period of the receiver is 4 seconds, and then the length of the first preamble can be at least 4 seconds.

In the embodiments of this disclosure, the relay device periodically wakes itself up from the intermittent sleeping state, and upon wake-up, the relay device detects whether there is a first preamble of a relay special frame. If a first preamble is detected, the relay device activates a data receiving function and receives a payload of the relay special frame following the first preamble. The first preamble and the following payload can be collectively referred to as the relay special frame. The first message set can be a payload part of a relay special frame. The first message set can also be referred to as a first information set. The "first message set" and the "first information set" are used interchangeably hereafter.

In the embodiments of this disclosure, step 101 can include the following sub-step.

In sub-step S1011, the first information set includes first time interval information, the first time interval information being used to indicate an information length of the first time interval.

Specifically, the first information set can be a payload part of a relay special frame. The first time interval information is a time interval between the relay special frame and a subsequent common frame. The first time interval can be random. For example, the terminal receives time interval information in the first information set, and parses out that the value of the time interval information is 10 milliseconds (ms). Then, the terminal opens a receiving window to receive a subsequent normal frame 10 ms after the completion of receiving the relay special frame. Optionally, the first time interval can be encrypted by a relay key. The relay key can be preset in the terminal and the relay device. The relay key can also be dynamically generated. For example, the relay key can be derived from a root key of the terminal. The root key used to derive the relay key can be a network key (NwkKey) or an application key (AppKey). After the terminal derives the relay key, an uplink data frame encrypted with the relay key is sent to a network server through the relay device. When forwarding the uplink data frame of the terminal, the relay device encapsulates the data frame, the encapsulated uplink data frame including an identifier of the relay device. The network server receives the encapsulated data frame sent by the relay device through the base station, determines a corresponding root key through a terminal identifier, and derives the relay key. Then, the network server sends the relay key to the relay device through the base station. Optionally, the terminal can carry a root key identifier when sending the uplink data frame. The root key identifier is used to cause the network server to determine the root key used to derive the relay key. For example, the root key identifier can represent a network key (NwkKey) or can also represent an application key (AppKey). By introducing the relay key, the terminal can decrypt the first information set and parse the first time interval information. And after waiting for the first time interval, a receiving time window is opened to receive a normal frame.

Randomization of a time interval can prevent an attacker from interfering with a common frame by sending a data frame at a specified time point after learning time interval information.

In the embodiments of this disclosure, step 101 can include the following sub-step.

In sub-step S1012, the first information set includes a security mechanism indicator, the security mechanism indicator being used to indicate a security level of the first information set.

Specifically, the security mechanism indicator can indicate whether the payload part of the relay special frame is encrypted. The security mechanism indicator itself is not encrypted. For example, when the security mechanism indicator is 1, it represents that the payload part of the relay special frame is encrypted by a relay key. When the security mechanism indicator is 0, it represents that the payload part of the relay special frame is not encrypted. The terminal can confirm the security level of the payload part of the relay special frame according to the security mechanism indicator.

In the embodiments of this disclosure, step 101 can include the following sub-step.

In sub-step S1013, the first information set includes a count value, the count value being used to confirm that the first message set is a non-repeatedly sent message set. Specifically, the count value in the first information set is mainly used to prevent an attacker from attacking the replay of the relay special frame. After receiving the count value, the terminal will compare it with the latest count value recorded before. If the count value in the relay special frame received by the terminal is greater than the count value recorded by the terminal, the terminal receives the relay special frame. If the count value in the relay special frame received by the terminal is not greater than the count value recorded by the terminal, the terminal discards the relay special frame.

In the embodiments of this disclosure, step 101 can include the following sub-step.

In sub-step S1014, the first information set includes first verification information, the first verification information being used to verify the second information set.

Specifically, the second information set is a payload part of a common frame following the relay special frame.

The first verification information can be a Message Integrity Code (MIC) for the second information set. The MIC can be calculated through the relay key. After receiving the MIC and the following common frame, the relay device can verify the MIC. If the verification succeeds, the relay device forwards the common frame to the base station. If the verification fails, the relay device discards the common frame. Optionally, the first verification information can also be signature information for the second information set. The relay device can verify the signature information according to the common frame. If the verification succeeds, the relay device forwards the common frame to the base station. If the verification fails, the relay device discards the common frame.

Adding verification information can effectively prevent the relay device from forwarding an illegal data frame sent by an attacker.

In the embodiments of this disclosure, step 101 can include the following sub-step.

In sub-step S1015, the first information set includes an encapsulation indicator, the encapsulation indicator being used to indicate whether the relay device encapsulates the second data frame.

Specifically, the encapsulation indicator can be used to indicate whether the relay device is capable of encapsulating the second data frame. The relay device uses the second data frame as a payload of a new encapsulated data frame, and adds an identifier of the relay device, control information of the encapsulated data frame, and an MAC instruction to the encapsulated data frame. The network server needs to forward the encapsulated data frame to a dedicated relay application server for processing.

In the embodiments of this disclosure, step 101 can include the following sub-step.

In sub-step S1016, the first information set includes spreading factor indication information, the spreading factor indication information being used to instruct the relay device to send the second data frame to the base station according to a spreading factor corresponding to the spreading factor indication information.

Specifically, the second data frame can be a data frame used for time synchronization between the terminal and a gateway. The terminal sends a time synchronization frame to the gateway through the relay device, and receives, through the relay device, a time synchronization response frame sent by the gateway. The terminal calculates a current calibration time of the terminal through information carried in the time synchronization response frame, such as time information when the gateway sends this frame and a relay mode receiving window. The terminal can specify, through the spreading factor indication information, the relay device to send the time synchronization frame to the gateway using a specific spreading factor. Therefore, it is helpful for the terminal to obtain an air interface occupation time for transmitting the time synchronization frame and a time synchronization acknowledgment frame between the relay device and the gateway, thereby achieving the purpose of time synchronization between the terminal and the gateway.

FIG. 9 shows an exemplary information structure of a payload part of a relay special frame. The first time interval information exists in the presence or absence of relay key encryption. The first verification information is used to verify the integrity of the second information set in the second data frame. The second verification information is used to verify the integrity of the first information set in the first data frame. In the absence of relay key encryption, the first information set may not have the first verification information and the second verification information, but can include the first time interval information, the encapsulation indicator, and the spreading factor indicator information.

In step 102, the terminal sends a second data frame to the relay device in the first mode, the second data frame including a second preamble and a second information set, the second data frame being sent after the terminal has sent the first data frame and a first time interval has elapsed, and the length of the second preamble being less than that of the first preamble.

Figure 3:
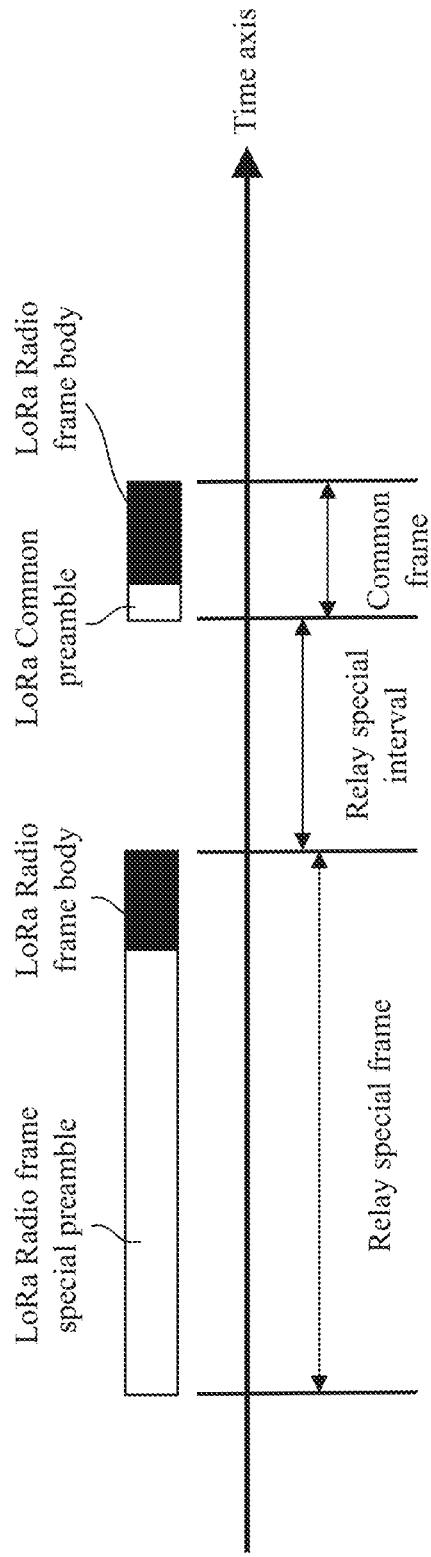
FIG. 3 is a schematic diagram of an exemplary transmission mechanism of a radio frame in a relay mode, consistent with some embodiments of the present disclosure.

Specifically, the first mode is a relay mode. The second data frame is a normal frame. The second preamble is a normal preamble. The second information set is a payload part of the normal frame. As shown in FIG. 3, the relay special frame is used to wake up the relay device. After acquiring a payload part of the special frame, the relay device can obtain information indicating whether the payload part is encrypted, a count value of the special frame, and the first verification information for the second information set. The relay device can determine the legality of a subsequent common frame according to the special frame part. And when determining that the subsequent common frame is illegal, the relay device refuses to forward the subsequent common frame. The reasons for determining that the subsequent common frame is illegal can be that the relay device determines that a count value of the relay special frame is not greater than a count value of the latest relay special frame recorded by the relay device.

Optionally, different channels can be used for the relay special frame and the common frame. For example, the relay special frame can be transmitted in channel 1, while the common frame can be transmitted in channel 2. Channel information used for the relay special frame and the common frame can be preset on the terminal and the relay device. The relay device and the terminal can update the channel usage information of the relay special frame and the common frame by receiving relay channel change information in an MAC instruction. Optionally, the payload part of the relay special frame can include the channel usage information of the common frame. After receiving corresponding channel usage information, the terminal can receive the common frame over a specified channel at a specified time.

Optionally, there can be a plurality of relay special frames preceding the common frame. The relay special frame can include a payload part or can only include a long preamble. A time interval between every two special frames can be a random and arbitrary time value. In the presence of a plurality of relay special frames, the detection of the plurality of special frames can be used as a basis for determination, and the common frame can be better protected. Optionally, the plurality of special frames can be transmitted using different channels. For example, channel 1 can be used for special frame 1. Channel 2 can be used for special frame 2. The channel usage information of the special frame can be included in the payload part of the previous special frame.

Figure 5:
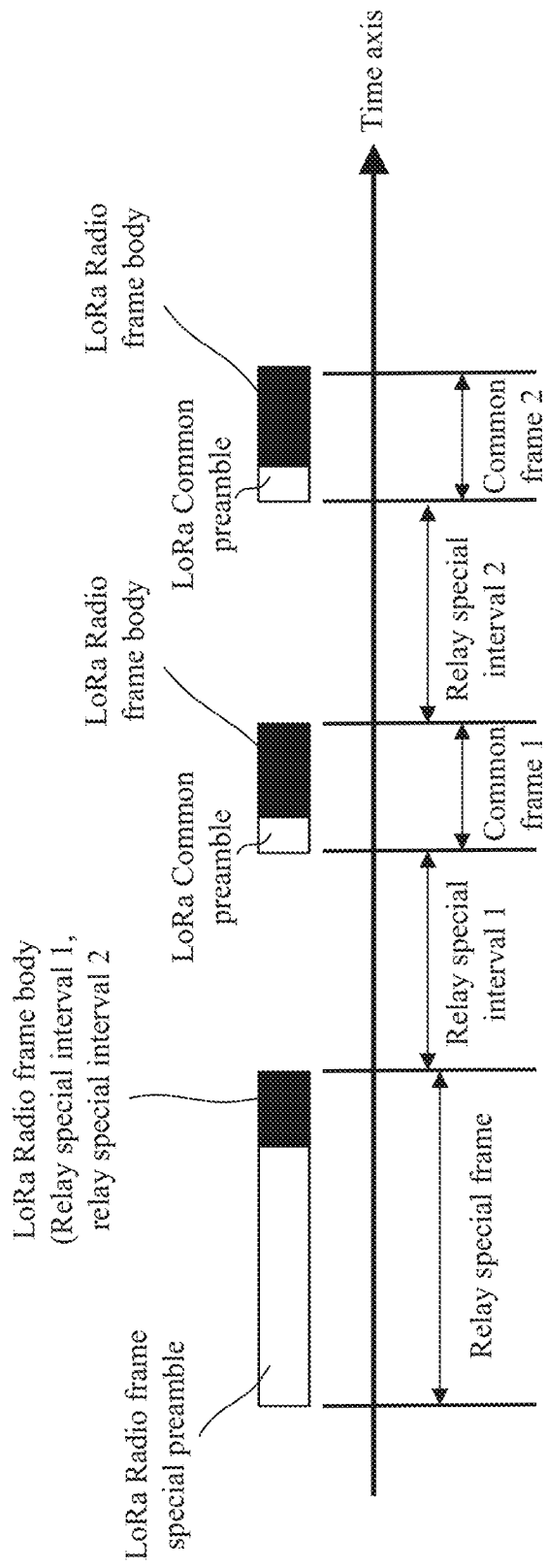
FIG. 5 is a schematic diagram of an exemplary transmission mechanism of a radio frame in a relay mode, consistent with some embodiments of the present disclosure.

Optionally, there can also be a plurality of common frames following a relay special frame. The relay special frame can include a plurality of pieces of time interval information, each of which corresponds to a time interval between a common frame and the previous frame. As shown in FIG. 5, a relay special frame is followed by two common frames, namely, common frame 1 and common frame 2. A payload part (radio frame body) of the relay special frame includes relay special interval information 1 and relay special interval information 2. Relay special interval information 1 represents an interval time (relay special interval 1) between the relay special frame and common frame 1. Relay special interval information 2 represents an interval time (relay special interval 2) between common frame 1 and common frame 2. Different relay special intervals can be different values. Different relay special intervals can reduce the probability that an attacker attacks a common frame at a specific time. Sending a plurality of common frames after a relay special frame can effectively improve the efficiency of relay transmission.

Optionally, the plurality of common frames can be transmitted using different channels. For example, channel 1 can be used for common frame 1. Channel 2 can be used for common frame 2. The channel usage information of the common frame can be included in the payload part of the previous common frame.

In the embodiments of this disclosure, step 102 can include the following sub-step.

In sub-step S1021, the second data frame can be a join request frame, the join request frame being used to request to join a network.

Specifically, the join request frame can be a join request frame of the LoRaWAN protocol standard. The relay device can be woken up by the relay special frame preceding the join request frame, and accept the join request frame after the first time interval. In this step, the join request frame can be regarded as a part of the common frame.

In step 103, the terminal receives a third data frame sent by the relay device in the first mode, the third data frame being sent to the terminal after being received from the base station by the relay device.

Specifically, the first mode is a relay mode. The third data frame is a downlink data frame sent by the server to the terminal. The server firstly sends the downlink data frame to a corresponding base station. Then, the base station sends the data frame to a corresponding relay device. Finally, the relay device sends the downlink data frame to the terminal.

Figure 4:
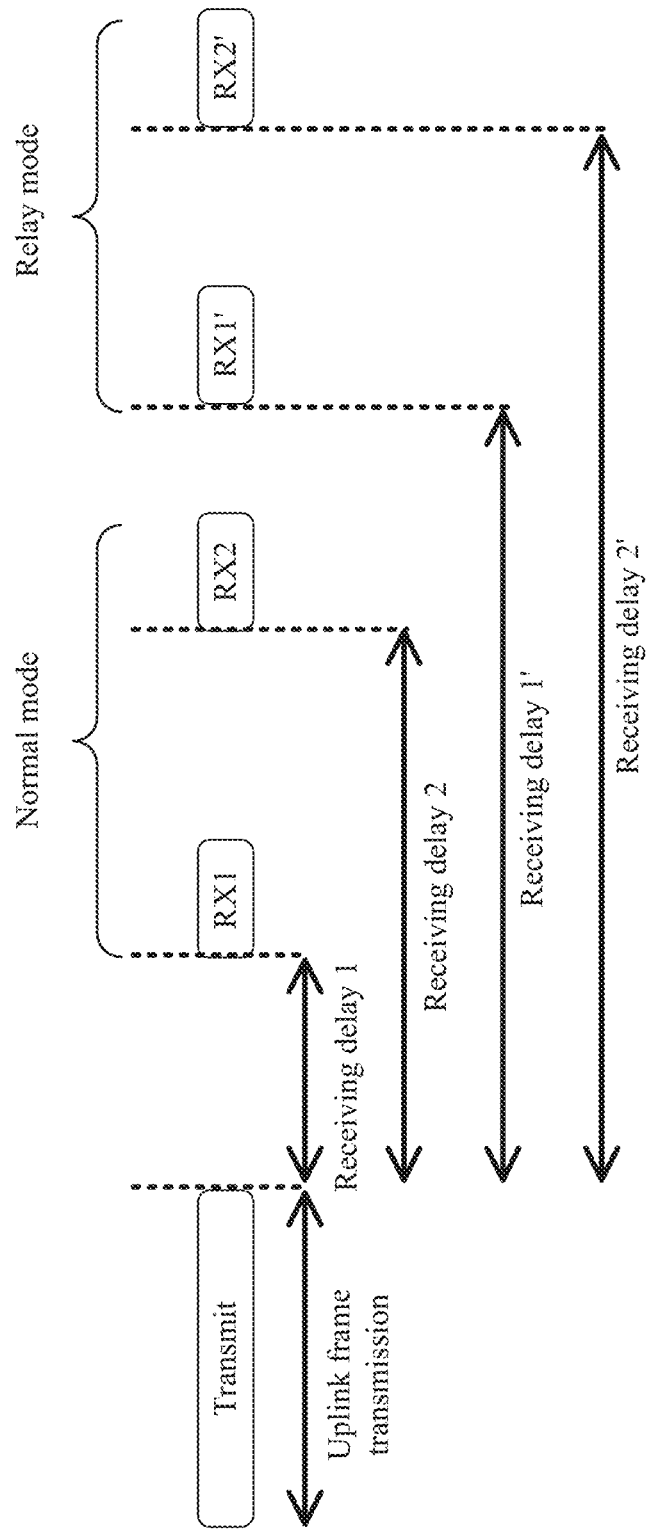
FIG. 4 is a schematic diagram of an exemplary receiving window in a normal mode and a relay mode, consistent with some embodiments of the present disclosure.

As shown in FIG. 4, the base station sends the downlink data frame to the relay device through a first receiving time window (RX1 window) and a second receiving time window (RX2 window) of a normal mode. The relay device sends the downlink data frame to the terminal through a first receiving window (RX1' window) and a second receiving window (RX2' window) of a relay mode. Receiving delay 1' and receiving delay 2' corresponding to the first receiving window (RX1' window) and the second receiving window (RX2' window) of the relay mode can be calculated from receiving delay 1 and receiving delay 2 corresponding to the first receiving window (RX1 window) and the second receiving window (RX2 window) of the normal mode. For example, receiving delay 1' of the RX1' window can be receiving delay 1 of the RX1 window plus 2 seconds. Similarly, receiving delay 2' of the RX2' window can be receiving delay 2 of the RX2 window plus 2 seconds. Optionally, receiving delay 1' and receiving delay 2' corresponding to the RX1' and RX2' windows can also be set to fixed lengths, such as 3 seconds and 4 seconds. Optionally, receiving delay 1' and receiving delay 2' corresponding to the RX1' and RX2' windows can also be less than receiving delay 1 and the receiving delay corresponding to the corresponding RX1 and RX2 windows. The present disclosure does not impose specific limitations.

In the embodiments of this disclosure, step 103 can include the following sub-step.

In sub-step S1031, the third data frame can be a join-accept frame, the join-accept frame being used to accept a join request of the terminal.

Specifically, the join-accept frame is a join-accept frame of the LoRaWAN protocol standard. The relay device receives the join-accept frame through the RX1 time window or the RX2 time window in a normal mode. Then, the relay device receives the join-accept frame through the RX1' time window or the RX2' time window in the relay mode.

In the embodiments of this disclosure, after the terminal receives the third data frame sent by the relay device, the method further includes the following sub-step.

In sub-step S1032, the terminal sends a fourth data frame to the relay device, the fourth data frame including a terminal identifier for causing the relay device to update a whitelist.

Specifically, the fourth data frame can be an information synchronization frame between the terminal and the relay device. The terminal identifier can be any one of a Device Extended Unique Identifier (DevEUI), a terminal address (DevAddr), or a Join Extended Unique Identifier (JoinEUI). After completing the join process in the relay mode, the terminal sends an information synchronization frame to the relay device, the information synchronization frame including the terminal identifier. The relay device updates the terminal identifier to the whitelist. The whitelist includes terminal identifiers of all terminals that the relay device thinks can forward messages. After receiving a relay special frame in the relay mode, the relay device parses out a terminal identifier in the special frame, and determines whether the terminal identifier exists in the whitelist. If the terminal identifier exists in the whitelist, the relay device receives a common frame following the relay special frame, and sends the common frame to the base station. Otherwise, the common frame following the relay special frame is not received. The whitelist can be preset in the relay device.

Optionally, after receiving the join response frame in the relay mode, the terminal can send at least one of DevEUI and DevAddr to the relay device. The corresponding whitelist is updated by the relay device. Optionally, the information synchronization frame carrying the terminal identifier and sent by the terminal to the relay device can be encrypted by a relay key. The relay device can use the relay key to decrypt the information synchronization frame firstly, and then update the whitelist. Optionally, the whitelist can also be configured through a Media Access Control (MAC) command issued by the network server. For example, the network server can issue a whitelist configuration command (WhiteListConfig Command) to the relay device through the base station. The WhiteListConfig Command includes a terminal identifier that needs to be deleted or a terminal identifier that needs to be added. After receiving the WhiteListConfig Command, the relay device deletes a corresponding terminal identifier or adds a corresponding terminal identifier according to the WhiteListConfig Command. The terminal identifier can be at least one of DevEUI and DevAddr.

Optionally, the payload part of the relay special frame can carry a terminal identifier. The terminal identifier can be DevAddr or DevEUI or joinEUI, and the relay device can determine in advance that the data frame of the terminal can be forwarded through the identifier (DevAddr or DevEUI) in the relay special frame sent by the terminal. Through this mechanism, the efficiency of whitelist filtering can be improved.

In the embodiments of this disclosure, after the terminal receives the third data frame sent by the relay device, the method further includes the following sub-step.

In sub-step S1033, the terminal determines, in the first mode and according to a first identifier, whether to monitor a first receiving time window and a second receiving time window in the second mode.

Specifically, the first mode is a relay mode. The second mode is a normal mode. The first identifier can be a normal mode receiving window receiving prohibition identifier. The first identifier is used to cause the terminal to determine whether to monitor the first receiving time window and the second receiving time window in the normal mode. In some scenarios, the terminal cannot receive the downlink data frame sent by the base station in the first receiving time window and the second receiving time window in the normal mode. If the terminal is caused to monitor the first receiving time window and the second receiving time window in the normal mode, unnecessary waste of resources will be caused. Therefore, it is possible to control the terminal to no longer monitor the receiving time window in the normal mode by setting a normal mode receiving window receiving prohibition identifier. For example, when the normal mode receiving window receiving prohibition identifier is set to 1, the terminal will no longer monitor any receiving time window in the normal mode. When the normal mode receiving window receiving prohibition identifier is set to 9, the terminal will monitor any receiving time window in the normal mode. Optionally, the network server can use an MAC instruction to change the normal mode receiving window receiving prohibition identifier of the terminal.

In the embodiments of this disclosure, step 103 can include the following sub-step.

In sub-step S1034, if the terminal receives, in the first mode and in any receiving time window in the second mode, the fourth data frame sent by the base station, the terminal is switched from the first mode to the second mode.

Specifically, the fourth data frame can be a downlink data frame in any form. If the terminal can receive, in the normal mode, the downlink data frame of any receiving time window sent by the base station, it means that the terminal can already communicate with the base station independently. Therefore, the terminal can be automatically switched from the relay mode to the normal mode. Moreover, a common frame format is used when an uplink data frame is sent. Optionally, the terminal can be switched from the relay mode to the normal mode after continuously receiving a plurality of downlink data frames of any receiving time window in the normal mode. By detecting that the downlink data frames in the normal mode are received many times and then switching back to the normal mode, the accuracy of switching the terminal back to the normal mode can be increased.

In the embodiments of this disclosure, the terminal wakes up the relay device through the long preamble mechanism, and sends the uplink data frame to the base station through the relay device. Meanwhile, the terminal can also acquire the downlink data frame sent by the base station through the relay device, which can effectively expand a network coverage range.

Figure 2:
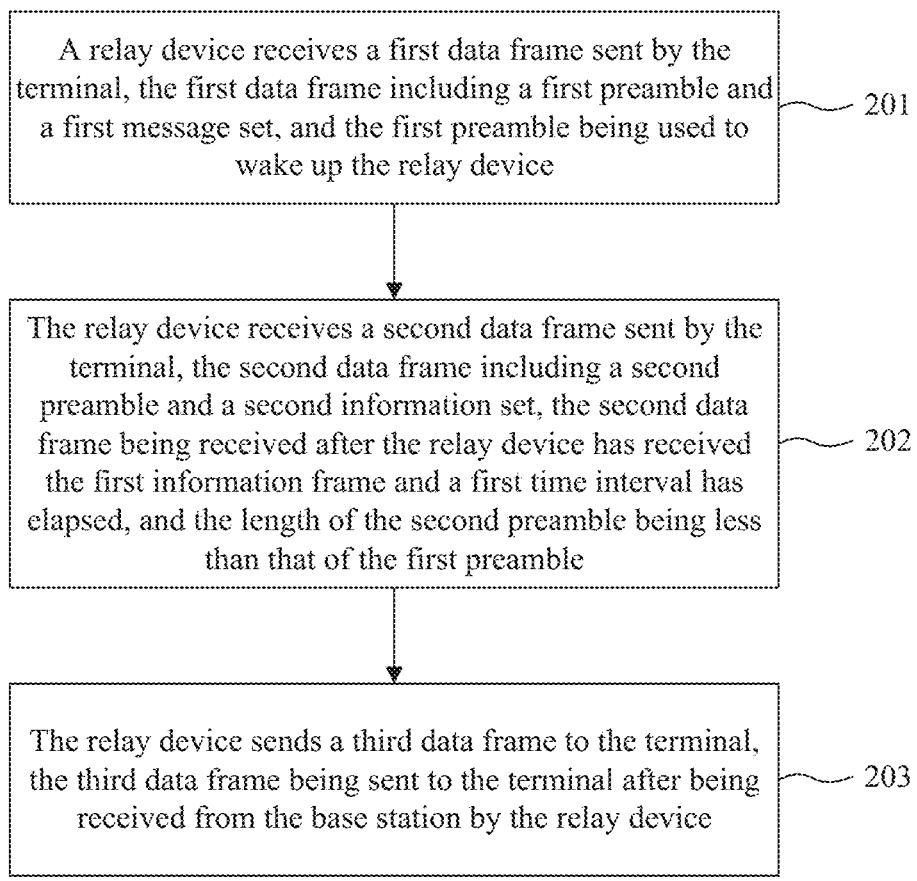
FIG. 2 is a flow chart of exemplary method by a relay device, consistent with some embodiments of the present disclosure.

FIG. 2 is a flow chart of exemplary method by a relay device, consistent with some embodiments of the present disclosure. The method can specifically include the following steps.

In step 201, a relay device receives a first data frame sent by the terminal, the first data frame including a first preamble and a first message set, and the first preamble being used to wake up the relay device.

In a standard join process, the terminal will send a join request frame with a second preamble to the base station. If the terminal can receive a join response frame returned by the base station, the standard join succeeds.

However, when mutual signal strengths between the terminal and the base station is insufficient, the join request frame sent by the terminal cannot reach the base station, or the join response frame returned by the base station cannot reach the terminal, then the standard join fails.

In the embodiments of this disclosure, a LoRa relay device is provided between the terminal and the base station, and the communication between the terminal and the base station can be established through the relay device.

For example, the terminal is buried underground and 500 meters away from the base station. If the terminal is unable to receive a base station signal due to ground obstacles, the relay device can be placed above the ground of a buried point of the terminal to play the role of signal relay.

In the embodiments of this disclosure, as a standard node, the relay device first joins the LoRa network according to the standard join process. That is, the relay device firstly sends a join request frame with a second preamble to the base station, and then receives a join response frame returned by the base station. After the standard join succeeds, the relay device enters an intermittent sleeping state to reduce power consumption.

When the standard join process of the terminal fails, the terminal can send a join request frame with a first preamble to the relay device that has already joined the network.

The preamble is a regular wireless signal for notifying a wireless receiver that the following wireless signal contains valid information.

In the embodiments of this disclosure, the second preamble and the first preamble are both wireless signals preceding the join request frame.

The second preamble is a standard preamble, which is a preamble in a standard format specified by a LoRaWAN protocol. The first preamble is a long preamble, the length of the first preamble being greater than that of the second preamble. The length of a preamble can include a duration.

Another purpose of the first preamble is to activate a sleeping wireless receiver, so the length of the first preamble is greater than that of the second preamble. For example, a sleeping period of the receiver is 4 seconds, the length of the first preamble can be at least 4 seconds.

In the embodiments of this disclosure, the relay device periodically wakes itself up from the intermittent sleeping state, and upon wake-up, the relay device detects whether there is a first preamble of a relay special frame. If a first preamble is detected, the relay device activates a data receiving function and receives a payload of the relay special frame following the first preamble. The first preamble and the following payload can be collectively referred to as the relay special frame. The first message set can be a payload part of a relay special frame.

In the embodiments of this disclosure, step 201 can include the following sub-step.

In sub-step S2011, the first information set includes first time interval information, the first time interval information being used to indicate an information length of the first time interval.

Specifically, the first information set can be a payload part of a relay special frame. The first time interval information is a time interval between the relay special frame and a subsequent common frame. The first time interval can be random. For example, the terminal receives time interval information in the first information set, and parses out that the value of the time interval information is 10 ms. Then, the terminal opens a receiving window to receive a subsequent normal frame 10 ms after the completion of receiving the relay special frame. Optionally, the first time interval can be encrypted by a relay key. The relay key can be preset in the terminal and the relay device. The relay key can also be dynamically generated. For example, the relay key can be derived from a root key of the terminal. The root key used to derive the relay key can be a network key (NwkKey) or an application key (AppKey). After the terminal derives the relay key, an uplink data frame encrypted with the relay key is sent to a network server through the relay device. When forwarding the uplink data frame of the terminal, the relay device encapsulates the data frame, the encapsulated uplink data frame including an identifier of the relay device. The network server receives the encapsulated data frame sent by the relay device through the base station, determines a corresponding root key through a terminal identifier, and derives the relay key. Then, the network server sends the relay key to the relay device through the base station. Optionally, the terminal can carry a root key identifier when sending the uplink data frame. The root key identifier is used to cause the network server to determine the root key used to derive the relay key. For example, the root key identifier can represent a network key (NwkKey) or can also represent an application key (AppKey). By introducing the relay key, the terminal can decrypt the first information set and parse the first time interval information. And after waiting for the first time interval, a receiving time window is opened to receive a normal frame.

By realizing the randomization of a time interval, it is possible to prevent an attacker from interfering with a common frame by sending a data frame at a specified time point after learning time interval information.

In the embodiments of this disclosure, step 201 can include the following sub-step.

In sub-step S2012, the first information set includes a security mechanism indicator, the security mechanism indicator being used to indicate a security level of the first information set.

Specifically, the security mechanism indicator can indicate whether the payload part of the relay special frame is encrypted. The security mechanism indicator itself is not encrypted. For example, when the security mechanism indicator is 1, it represents that the payload part of the relay special frame is encrypted by a relay key. When the security mechanism indicator is 0, it represents that the payload part of the relay special frame is not encrypted. The terminal can confirm the security level of the payload part of the relay special frame according to the security mechanism indicator.

In the embodiments of this disclosure, step 201 can include the following sub-step.

In sub-step S2013, the first information set includes a count value, the count value being used to confirm that the first message set is a non-repeatedly sent message set. Specifically, the count value in the first information set is mainly used to prevent an attacker from attacking the replay of the relay special frame. After receiving the count value, the terminal will compare it with the latest count value recorded before. If the count value in the relay special frame received by the terminal is greater than the count value recorded by the terminal, the terminal receives the relay special frame. If the count value in the relay special frame received by the terminal is not greater than the count value recorded by the terminal, the terminal discards the relay special frame.

In the embodiments of this disclosure, step 201 can include the following sub-step.

In sub-step S2014, the first information set includes first verification information, the first verification information being used to verify the second information set. Specifically, the second information set is a payload part of a common frame following the relay special frame.

The first verification information can be a Message Integrity Code (MIC) for the second information set. The MIC can be calculated through the relay key. After receiving the MIC and the following common frame, the relay device can verify the MIC. If the verification succeeds, the relay device forwards the common frame to the base station. If the verification fails, the relay device discards the common frame. Optionally, the first verification information can also be signature information for the second information set. The relay device can verify the signature information according to the common frame. If the verification succeeds, the relay device forwards the common frame to the base station. If the verification fails, the relay device discards the common frame.

Adding verification information can effectively prevent the relay device from forwarding an illegal data frame sent by an attacker.

In the embodiments of this disclosure, step 201 can include the following sub-step.

In sub-step S2015, the first information set includes an encapsulation indicator, the encapsulation indicator being used to indicate whether the relay device encapsulates the second data frame.

Specifically, the encapsulation indicator can be used to indicate whether the relay device is capable of encapsulating the second data frame. The relay device uses the second data frame as a payload of a new encapsulated data frame, and adds an identifier of the relay device, control information of the encapsulated data frame, and an MAC instruction to the encapsulated data frame. The network server needs to forward the encapsulated data frame to a dedicated relay application server for processing.

In the embodiments of this disclosure, step 201 can include the following sub-step.

In sub-step S2016, the first information set includes spreading factor indication information, the spreading factor indication information being used to instruct the relay device to send the second data frame to the base station according to a spreading factor corresponding to the spreading factor indication information. Specifically, the second data frame can be a data frame used for time synchronization between the terminal and a gateway. The terminal sends a time synchronization frame to the gateway through the relay device, and receives, through the relay device, a time synchronization response frame sent by the gateway. The terminal calculates a current calibration time of the terminal through information carried in the time synchronization response frame, such as time information when the gateway sends this frame and a relay mode receiving window. The terminal can specify, through the spreading factor indication information, the relay device to send the time synchronization frame to the gateway using a specific spreading factor. Therefore, it is helpful for the terminal to obtain an air interface occupation time for transmitting the time synchronization frame and a time synchronization acknowledgment frame between the relay device and the gateway, thereby achieving the purpose of time synchronization between the terminal and the gateway.

In step 202, the relay device receives a second data frame sent by the terminal, the second data frame including a second preamble and a second information set, the second data frame being received after the relay device has received the first information frame and a first time interval has elapsed, and the length of the second preamble being less than that of the first preamble.

Specifically, the first mode is a relay mode. The second data frame is a normal frame. The second preamble is a normal preamble. The second information set is a payload part of the normal frame. As shown in FIG. 3, the relay special frame is used to wake up the relay device. After acquiring a payload part of the special frame, the relay device can obtain information indicating whether the payload part is encrypted, a count value of the special frame, and the first verification information for the second information set. The relay device can determine the legality of a subsequent common frame according to the special frame part. And when determining that the subsequent common frame is illegal, the relay device refuses to forward the subsequent common frame. The reasons for determining that the subsequent common frame is illegal can be that the relay device determines that a count value of the relay special frame is not greater than a count value of the latest relay special frame recorded by the relay device.

Optionally, there can be a plurality of relay special frames preceding the common frame. The relay special frame can include a payload part or can only include a long preamble. A time interval between every two special frames can be a random and arbitrary time value. In the presence of a plurality of relay special frames, the detection of the plurality of special frames can be used as a basis for determination, and the common frame can be better protected.

Optionally, there can also be a plurality of common frames following a relay special frame. The relay special frame can include a plurality of pieces of time interval information, each of which corresponds to a time interval between a common frame and the previous frame. As shown in FIG. 5, a relay special frame is followed by two common frames, namely, common frame 1 and common frame 2. A payload part (radio frame body) of the relay special frame includes relay special interval information 1 and relay special interval information 2. Relay special interval information 1 represents an interval time (relay special interval 1) between the relay special frame and common frame 1. Relay special interval information 2 represents an interval time (relay special interval 2) between common frame 1 and common frame 2. Different relay special intervals can be different values. Different relay special intervals can reduce the probability that an attacker attacks a common frame at a specific time. Sending a plurality of common frames after a relay special frame can effectively improve the efficiency of relay transmission.

In the embodiments of this disclosure, step 202 can include the following sub-step.

In sub-step S2021, the second data frame can be a join request frame, the join request frame being used to request to join a network. Specifically, the join request frame can be a join request frame of the LoRaWAN protocol standard. The relay device can be woken up by the relay special frame preceding the join request frame, and accept the join request frame after the first time interval. In this step, the join request frame can be regarded as a part of the common frame.

In step 203, the relay device sends a third data frame to the terminal, the third data frame being sent to the terminal after being received from the base station by the relay device. Specifically, the first mode is a relay mode. The third data frame is a downlink data frame sent by the server to the terminal. The server firstly sends the downlink data frame to a corresponding base station. Then, the base station sends the data frame to a corresponding relay device. Finally, the relay device sends the downlink data frame to the terminal.

As shown in FIG. 4, the base station sends the downlink data frame to the relay device through a first receiving time window (RX1 window) and a second receiving time window (RX2 window) of a normal mode. The relay device sends the downlink data frame to the terminal through a first receiving window (RX1' window) and a second receiving window (RX2' window) of a relay mode. Receiving delay 1' and receiving delay 2' corresponding to the first receiving window (RX1' window) and the second receiving window (RX2' window) of the relay mode can be calculated from receiving delay 1 and receiving delay 2 corresponding to the first receiving window (RX1 window) and the second receiving window (RX2 window) of the normal mode. For example, receiving delay 1' of the RX1' window can be receiving delay 1 of the RX1 window plus 2 seconds. Similarly, receiving delay 2' of the RX2' window can be receiving delay 2 of the RX2 window plus 2 seconds. Optionally, receiving delay 1' and receiving delay 2' corresponding to the RX1' and RX2' windows can also be set to fixed lengths, such as 3 seconds and 4 seconds. Optionally, receiving delay 1' and receiving delay 2' corresponding to the RX1' and RX2' windows can also be less than receiving delay 1 and the receiving delay corresponding to the corresponding RX1 and RX2 windows. The present disclosure does not impose specific limitations.

In the embodiments of this disclosure, step 203 can include the following sub-step.

In sub-step S2031, the third data frame can be a join-accept frame, the join-accept frame being used to accept a join request of the terminal. Specifically, the join-accept frame is a join-accept frame of the LoRaWAN protocol standard. The relay device receives the join-accept frame through the RX1 time window or the RX2 time window in a normal mode. Then, the relay device receives the join-accept frame through the RX1' time window or the RX2' time window in the relay mode.

In the embodiments of this disclosure, step 203 can include the following sub-step.

In sub-step S2032, the relay device receives a fourth data frame sent by the terminal, the fourth data frame including a terminal identifier for causing the relay device to update a whitelist. Specifically, the fourth data frame can be an information synchronization frame between the terminal and the relay device. The terminal identifier can be any one of a Device Extended Unique Identifier (DevEUI), a terminal address (DevAddr), or a Join Extended Unique Identifier (JoinEUI). After completing the join process in the relay mode, the terminal sends an information synchronization frame to the relay device, the information synchronization frame including the terminal identifier. The relay device updates the terminal identifier to the whitelist. The whitelist includes terminal identifiers of all terminals that the relay device thinks can forward messages. After receiving a relay special frame in the relay mode, the relay device parses out a terminal identifier in the special frame, and determines whether the terminal identifier exists in the whitelist. If the terminal identifier exists in the whitelist, the relay device receives a common frame following the relay special frame, and sends the common frame to the base station. Otherwise, the common frame following the relay special frame is not received. The whitelist can be preset in the relay device.

Optionally, after receiving the join response frame in the relay mode, the terminal can send at least one of DevEUI and DevAddr to the relay device. The corresponding whitelist is updated by the relay device. Optionally, the information synchronization frame carrying the terminal identifier and sent by the terminal to the relay device can be encrypted by a relay key. The relay device can use the relay key to decrypt the information synchronization frame firstly, and then update the whitelist. Optionally, the whitelist can also be configured through a Media Access Control (MAC) command issued by the network server. For example, the network server can issue a whitelist configuration command (WhiteListConfig Command) to the relay device through the base station. The WhiteListConfig Command includes a terminal identifier that needs to be deleted or a terminal identifier that needs to be added. After receiving the WhiteListConfig Command, the relay device deletes a corresponding terminal identifier or adds a corresponding terminal identifier according to the WhiteListConfig Command. The terminal identifier can be at least one of DevEUI and DevAddr.

Figure 7:
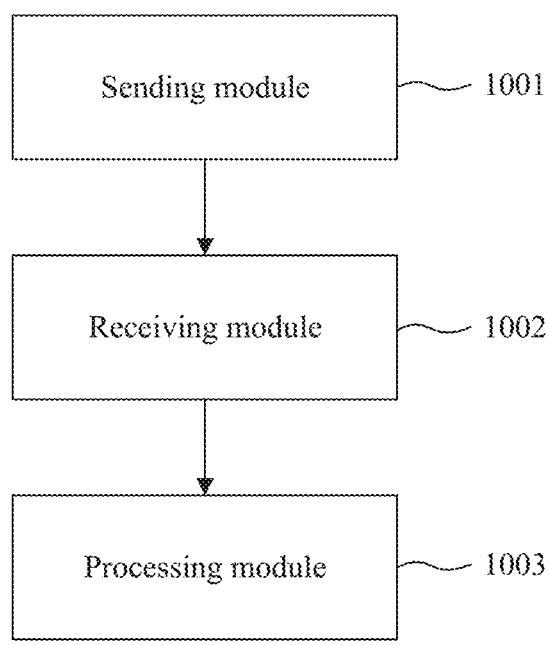
FIG. 7 is a schematic diagram of an exemplary terminal, consistent with some embodiments of the present disclosure.

FIG. 7 is a schematic diagram of an exemplary terminal, consistent with some embodiments of the present disclosure. The terminal can specifically include a sending module 1001, a receiving module 1002, and a processing module 1003.

Sending module 1001 is configured to send a first data frame to a relay device in a first mode, the first data frame including a first preamble and a first message set, and the first preamble being used to wake up the relay device.

In a standard join process, the terminal will send a join request frame with a second preamble to the base station. If the terminal can receive a join response frame returned by the base station, the standard join succeeds.

However, when mutual signal strengths between the terminal and the base station is insufficient, the join request frame sent by the terminal cannot reach the base station, or the join response frame returned by the base station cannot reach the terminal, then the standard join fails.

In the embodiments of this disclosure, a LoRa relay device is provided between the terminal and the base station, and the communication between the terminal and the base station can be established through the relay device.

For example, the terminal is buried underground and 500 meters away from the base station. If the terminal is unable to receive a base station signal due to ground obstacles, the relay device can be placed above the ground of a buried point of the terminal to play the role of signal relay.

In the embodiments of this disclosure, as a standard node, the relay device first joins the LoRa network according to the standard join process. That is, the relay device firstly sends a join request frame with a second preamble to the base station, and then receives a join response frame returned by the base station. After the standard join succeeds, the relay device enters an intermittent sleeping state to reduce power consumption.

When the standard join process of the terminal fails, the terminal can send a join request frame with a first preamble to the relay device that has already joined the network.

The preamble is a regular wireless signal for notifying a wireless receiver that the following wireless signal contains valid information.

In the embodiments of this disclosure, the second preamble and the first preamble are both wireless signals preceding the join request frame.

The second preamble is a standard preamble, which is a preamble in a standard format specified by a LoRaWAN protocol. The first preamble is a long preamble, the length of the first preamble being greater than that of the second preamble. The length of a preamble can include a duration.

Another purpose of the first preamble is to activate a sleeping wireless receiver, so the length of the first preamble is greater than that of the second preamble. For example, a sleeping period of the receiver is 4 seconds, the length of the first preamble can be at least 4 seconds.

In the embodiments of this disclosure, the relay device periodically wakes itself up from the intermittent sleeping state, and upon wake-up, the relay device detects whether there is a first preamble of a relay special frame. If a first preamble is detected, the relay device activates a data receiving function and receives a payload of the relay special frame following the first preamble. The first preamble and the following payload can be collectively referred to as the relay special frame. The first message set can be a payload part of a relay special frame.

Sending module 1001 is configured to send a second data frame to the relay device in the first mode, the second data frame including a second preamble and a second information set, the second data frame being sent after the terminal has sent the first data frame and a first time interval has elapsed, and the length of the second preamble being less than that of the first preamble.

Specifically, the first mode is a relay mode. The second data frame is a normal frame. The second preamble is a normal preamble. The second information set is a payload part of the normal frame. As shown in FIG. 3, the relay special frame is used to wake up the relay device. After acquiring a payload part of the special frame, the relay device can obtain information indicating whether the payload part is encrypted, a count value of the special frame, and the first verification information for the second information set. The relay device can determine the legality of a subsequent common frame according to the special frame part. And when determining that the subsequent common frame is illegal, the relay device refuses to forward the subsequent common frame. The reasons for determining that the subsequent common frame is illegal can be: 1. the relay device determines that a count value of the relay special frame is not greater than a count value of the latest relay special frame recorded by the relay device.

Optionally, different channels can be used for the relay special frame and the common frame. For example, the relay special frame can be transmitted in channel 1, while the common frame can be transmitted in channel 2. Channel information used for the relay special frame and the common frame can be preset on the terminal and the relay device. The relay device and the terminal can update the channel usage information of the relay special frame and the common frame by receiving relay channel change information in an MAC instruction. Optionally, the payload part of the relay special frame can include the channel usage information of the common frame. After receiving corresponding channel usage information, the terminal can receive the common frame over a specified channel at a specified time.

Optionally, there can be a plurality of relay special frames preceding the common frame. The relay special frame can include a payload part or can only include a long preamble. A time interval between every two special frames can be a random and arbitrary time value. In the presence of a plurality of relay special frames, the detection of the plurality of special frames can be used as a basis for determination, and the common frame can be better protected. Optionally, the plurality of special frames can be transmitted using different channels. For example, channel 1 can be used for special frame 1. Channel 2 can be used for special frame 2. The channel usage information of the special frame can be included in the payload part of the previous special frame.

Optionally, there can also be a plurality of common frames following a relay special frame. The relay special frame can include a plurality of pieces of time interval information, each of which corresponds to a time interval between a common frame and the previous frame. As shown in FIG. 5, a relay special frame is followed by two common frames, namely, common frame 1 and common frame 2. A payload part (radio frame body) of the relay special frame includes relay special interval information 1 and relay special interval information 2. Relay special interval information 1 represents an interval time (relay special interval 1) between the relay special frame and common frame 1. Relay special interval information 2 represents an interval time (relay special interval 2) between common frame 1 and common frame 2. Different relay special intervals can be different values. Different relay special intervals can reduce the probability that an attacker attacks a common frame at a specific time. Sending a plurality of common frames after a relay special frame can effectively improve the efficiency of relay transmission.

Optionally, the plurality of common frames can be transmitted using different channels. For example, channel 1 can be used for common frame 1. Channel 2 can be used for common frame 2. The channel usage information of the common frame can be included in the payload part of the previous common frame.

Receiving module 1002 is configured to receive a third data frame sent by the relay device in the first mode, the third data frame being sent to the terminal after being received from a base station by the relay device. Specifically, the first mode is a relay mode. The third data frame is a downlink data frame sent by the server to the terminal. The server firstly sends the downlink data frame to a corresponding base station. Then, the base station sends the data frame to a corresponding relay device. Finally, the relay device sends the downlink data frame to the terminal.

As shown in FIG. 4, the base station sends the downlink data frame to the relay device through a first receiving time window (RX1 window) and a second receiving time window (RX2 window) of a normal mode. The relay device sends the downlink data frame to the terminal through a first receiving window (RX1' window) and a second receiving window (RX2' window) of a relay mode. Receiving delay 1' and receiving delay 2' corresponding to the first receiving window (RX1' window) and the second receiving window (RX2' window) of the relay mode can be calculated from receiving delay 1 and receiving delay 2 corresponding to the first receiving window (RX1 window) and the second receiving window (RX2 window) of the normal mode. For example, receiving delay 1' of the RX1' window can be receiving delay 1 of the RX1 window plus 2 seconds. Similarly, receiving delay 2' of the RX2' window can be receiving delay 2 of the RX2 window plus 2 seconds. Optionally, receiving delay 1' and receiving delay 2' corresponding to the RX1' and RX2' windows can also be set to fixed lengths, such as 3 seconds and 4 seconds. Optionally, receiving delay 1' and receiving delay 2' corresponding to the RX1' and RX2' windows can also be less than receiving delay 1 and the receiving delay corresponding to the corresponding RX1 and RX2 windows. The present disclosure does not impose specific limitations.

In the embodiments of this disclosure, the terminal can further include the following module.

Processing module 1003 is configured to determine, in the first mode and according to a first identifier, whether to monitor a first receiving time window and a second receiving time window in the second mode after the terminal receives the third data frame sent by the relay device. Specifically, the first mode is a relay mode. The second mode is a normal mode. The first identifier can be a normal mode receiving window receiving prohibition identifier. The first identifier is used to cause the terminal to determine whether to monitor the first receiving time window and the second receiving time window in the normal mode. In some scenarios, the terminal cannot receive the downlink data frame sent by the base station in the first receiving time window and the second receiving time window in the normal mode. If the terminal is caused to monitor the first receiving time window and the second receiving time window in the normal mode, unnecessary waste of resources will be caused. Therefore, it is possible to control the terminal to no longer monitor the receiving time window in the normal mode by setting a normal mode receiving window receiving prohibition identifier. For example, when the normal mode receiving window receiving prohibition identifier is set to 1, the terminal will no longer monitor any receiving time window in the normal mode. When the normal mode receiving window receiving prohibition identifier is set to 9, the terminal will monitor any receiving time window in the normal mode. Optionally, the network server can use an MAC instruction to change the normal mode receiving window receiving prohibition identifier of the terminal.

In the embodiments of this disclosure, the terminal can further include the following module.

Processing module 1003 is configured to switch from the first mode to the second mode after the terminal receives, in the first mode and in any receiving time window in the second mode, the fourth data frame sent by the base station. Specifically, the fourth data frame can be a downlink data frame in any form. If the terminal can receive, in the normal mode, the downlink data frame of any receiving time window sent by the base station, it means that the terminal can already communicate with the base station independently. Therefore, the terminal can be automatically switched from the relay mode to the normal mode. And when an uplink data frame is sent, a common frame format is used. Optionally, the terminal can be switched from the relay mode to the normal mode after continuously receiving a plurality of downlink data frames of any receiving time window in the normal mode. By detecting that the downlink data frames in the normal mode are received many times and then switching back to the normal mode, the accuracy of switching the terminal back to the normal mode can be increased.

Figure 8:
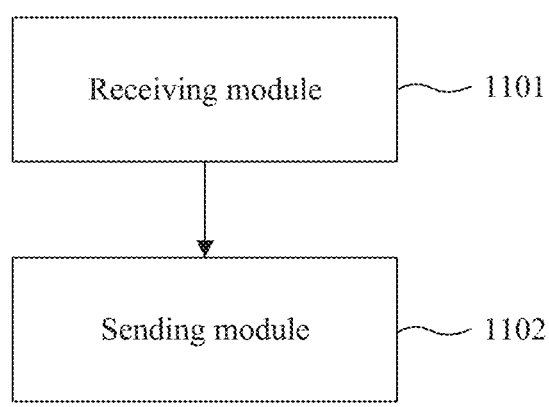
FIG. 8 is a schematic of an exemplary relay device, consistent with some embodiments of the present disclosure.

FIG. 8 is a schematic of an exemplary relay device, consistent with some embodiments of the present disclosure. The exemplary relay device can specifically include a receiving module 1101 and a sending module 1102.

Receiving module 1101 is configured to receive a first data frame sent by a terminal, the first data frame including a first preamble and a first message set, and the first preamble being used to wake up the relay device.

In a standard join process, the terminal will send a join request frame with a second preamble to the base station. If the terminal can receive a join response frame returned by the base station, the standard join succeeds.

However, when mutual signal strengths between the terminal and the base station is insufficient, the join request frame sent by the terminal cannot reach the base station, or the join response frame returned by the base station cannot reach the terminal, then the standard join fails.

In the embodiments of this disclosure, a LoRa relay device is provided between the terminal and the base station, and the communication between the terminal and the base station can be established through the relay device. For example, the terminal is buried underground and 500 meters away from the base station. If the terminal is unable to receive a base station signal due to ground obstacles, the relay device can be placed above the ground of a buried point of the terminal to play the role of signal relay.

In the embodiments of this disclosure, as a standard node, the relay device first joins the LoRa network according to the standard join process. That is, the relay device firstly sends a join request frame with a second preamble to the base station, and then receives a join response frame returned by the base station. After the standard join succeeds, the relay device enters an intermittent sleeping state to reduce power consumption.

When the standard join process of the terminal fails, the terminal can send a join request frame with a first preamble to the relay device that has already joined the network.

The preamble is a regular wireless signal for notifying a wireless receiver that the following wireless signal contains valid information.

In the embodiments of this disclosure, the second preamble and the first preamble are both wireless signals preceding the join request frame.

The second preamble is a standard preamble, which is a preamble in a standard format specified by a LoRaWAN protocol. The first preamble is a long preamble, the length of the first preamble being greater than that of the second preamble. The length of a preamble can include a duration.

Another purpose of the first preamble is to activate a sleeping wireless receiver, so the length of the first preamble is greater than that of the second preamble. For example, a sleeping period of the receiver is 4 seconds, the length of the first preamble can be at least 4 seconds.

In the embodiments of this disclosure, the relay device periodically wakes itself up from the intermittent sleeping state, and upon wake-up, the relay device detects whether there is a first preamble of a relay special frame. If a first preamble is detected, the relay device activates a data receiving function and receives a payload of the relay special frame following the first preamble. The first preamble and the following payload can be collectively referred to as the relay special frame. The first message set can be a payload part of a relay special frame.

Receiving module 1101 is configured to receive a second data frame sent by the terminal, the second data frame including a second preamble and a second information set, the second data frame being received after the relay device has received the first information frame and a first time interval has elapsed, and the length of the second preamble being less than that of the first preamble. Specifically, the first mode is a relay mode. The second data frame is a normal frame. The second preamble is a normal preamble. The second information set is a payload part of the normal frame. As shown in FIG. 3, the relay special frame is used to wake up the relay device. After the relay device acquires a payload part of the special frame, information indicating whether the payload part is encrypted, a count value of the special frame, and the first verification information for the second information set can be obtained. The relay device can determine the legality of a subsequent common frame according to the special frame part. And when determining that the subsequent common frame is illegal, the relay device refuses to forward the subsequent common frame. The reasons for determining that the subsequent common frame is illegal can be that the relay device determines that a count value of the relay special frame is not greater than a count value of the latest relay special frame recorded by the relay device.

Optionally, there can be a plurality of relay special frames preceding the common frame. The relay special frame can include a payload part or can only include a long preamble. A time interval between every two special frames can be a random and arbitrary time value. In the presence of a plurality of relay special frames, the detection of the plurality of special frames can be used as a basis for determination, and the common frame can be better protected.

Optionally, there can also be a plurality of common frames following a relay special frame. The relay special frame can include a plurality of pieces of time interval information, each of which corresponds to a time interval between a common frame and the previous frame. As shown in FIG. 5, a relay special frame is followed by two common frames, namely, common frame 1 and common frame 2. A payload part (radio frame body) of the relay special frame includes relay special interval information 1 and relay special interval information 2. Relay special interval information 1 represents an interval time (relay special interval 1)

between the relay special frame and common frame 1. Relay special interval information 2 represents an interval time (relay special interval 2) between common frame 1 and common frame 2. Different relay special intervals can be different values. Different relay special intervals can reduce the probability that an attacker attacks a common frame at a specific time. Sending a plurality of common frames after a relay special frame can effectively improve the efficiency of relay transmission.

Sending module 1102 is configured to send a third data frame to the terminal, the third data frame being sent to the terminal after being received from the base station by the relay device. Specifically, the first mode is a relay mode. The third data frame is a downlink data frame sent by the server to the terminal. The server firstly sends the downlink data frame to a corresponding base station. Then, the base station sends the data frame to a corresponding relay device. Finally, the relay device sends the downlink data frame to the terminal.

As shown in FIG. 4, the base station sends the downlink data frame to the relay device through a first receiving time window (RX1 window) and a second receiving time window (RX2 window) of a normal mode. The relay device sends the downlink data frame to the terminal through a first receiving window (RX1' window) and a second receiving window (RX2' window) of a relay mode. Receiving delay 1' and receiving delay 2' corresponding to the first receiving window (RX1' window) and the second receiving window (RX2' window) of the relay mode can be calculated from receiving delay 1 and receiving delay 2 corresponding to the first receiving window (RX1 window) and the second receiving window (RX2 window) of the normal mode. For example, receiving delay 1' of the RX1' window can be receiving delay 1 of the RX1 window plus 2 seconds. Similarly, receiving delay 2' of the RX2' window can be receiving delay 2 of the RX2 window plus 2 seconds. Optionally, receiving delay 1' and receiving delay 2' corresponding to the RX1' and RX2' windows can also be set to fixed lengths, such as 3 seconds and 4 seconds. Optionally, receiving delay 1' and receiving delay 2' corresponding to the RX1' and RX2' windows can also be less than receiving delay 1 and the receiving delay corresponding to the corresponding RX1 and RX2 windows. The present disclosure does not impose specific limitations.

Figure 6:
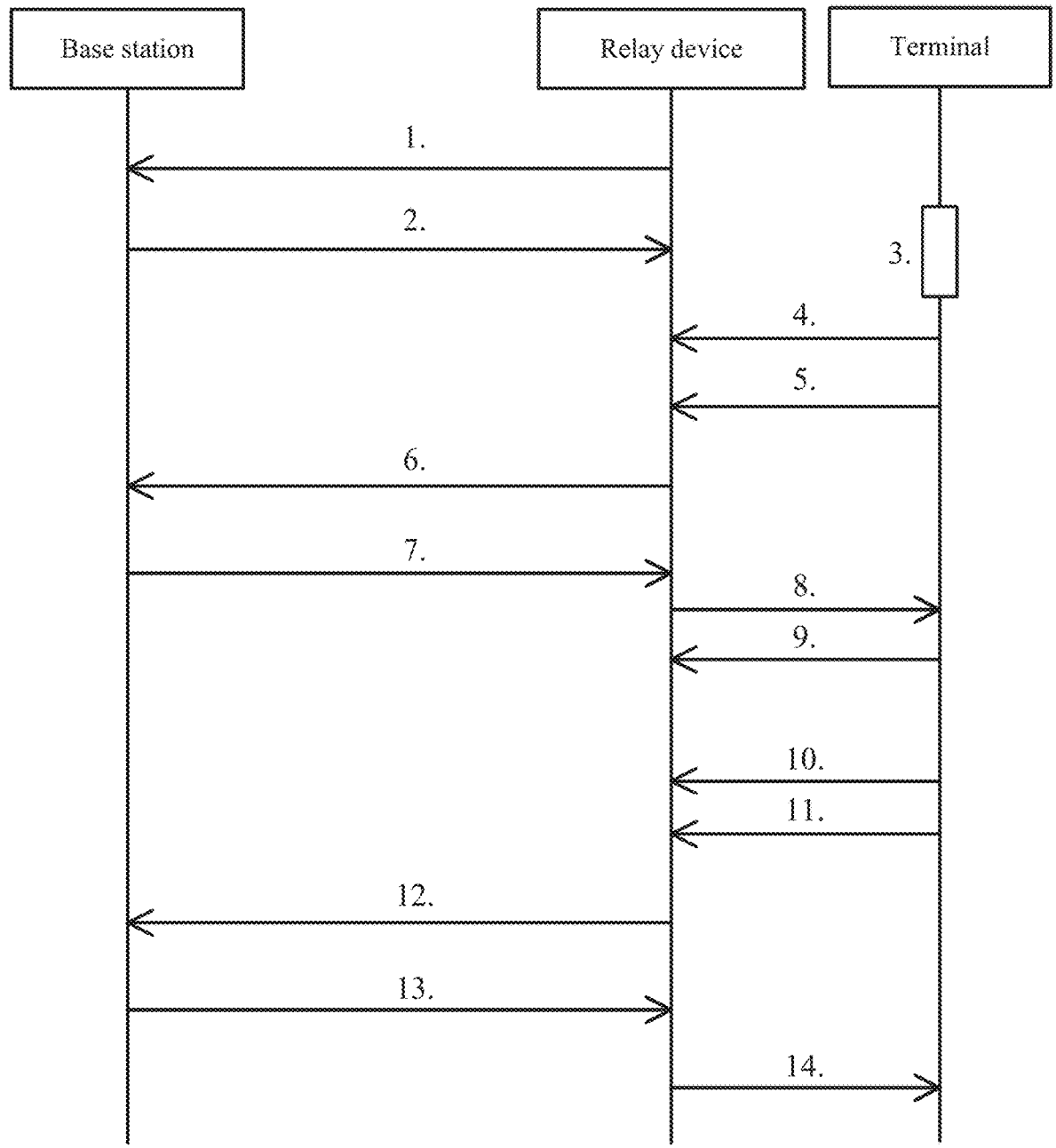
FIG. 6 is a flow chart of exemplary communication between a terminal and a base station, consistent with some embodiments of the present disclosure.

FIG. 6 is a flow chart of exemplary communication between a terminal and a base station, consistent with some embodiments of the present disclosure. The exemplary communication can include the following steps.

In step 1, a relay device sends a join request frame to the base station, the join request frame being a standard join request frame.

In step 2, the relay device receives a join-accept frame sent by the base station, the join-accept frame being a standard join-accept frame.

In step 3, the terminal sends a join request frame with a normal-length preamble in a normal mode, but does not receive a join-accept frame, so a standard join process fails.

In step 4, the terminal is switched to a relay mode and sends a relay special frame having features such as a special signal phase and a special frame length, and a relay can identify the special frame through the features. The special frame can carry relay special interval information, verification information of subsequent common frames, a frame sequence number, a security mechanism identifier, etc.

In step 5, the terminal waits for a relay special interval after sending the relay special frame, and then sends a subsequent common frame. In some embodiments, the common frame is a join request frame.

In step 6, the relay device recognizes the relay special frame, receives a subsequent join request frame (common frame), and forwards the join request frame to the base station.

In step 7, the relay device receives a join-accept frame from the base station.

In step 8, the relay device forwards the join-accept frame to a relay mode receiving window of a node. The terminal node successfully joins the network.

In step 9, the terminal can send its own DevAddr information to the relay, and the relay updates its whitelist accordingly.

In step 10, the terminal sends a relay special frame having features such as a special signal phase and a special frame length, and the relay can identify the special frame through the features. The special frame can carry relay special interval information, verification information of subsequent common frames, a frame sequence number, a security mechanism identifier, etc.

In step 11, the terminal waits for a relay special interval after sending the relay special frame, and then sends a subsequent common frame.

In step 12, the relay device recognizes the relay special frame, receives a subsequent uplink data frame (common frame), and forwards the uplink data frame to the base station.

In step 13, the relay device receives a downlink data frame from the base station.

In step 14, the relay device forwards the downlink data frame to an ultimate mode receiving window of the terminal. The uplink and downlink communication of the terminal succeeds.

The embodiments of this disclosure also provide an apparatus, including: one or more processors; and one or more machine-readable media having instructions stored thereon, wherein when executed by the one or more processors, the instructions cause the apparatus to perform the method described in the embodiments of this disclosure.

The embodiments of this disclosure also provide one or more machine-readable media having instructions stored thereon, wherein when executed by one or more processors, the instructions cause an apparatus to perform the method described in the embodiments of this disclosure.

It is appreciated that terms "first," "second," and so on used in the specification, claims, and the drawings of the present disclosure are used to distinguish similar objects. These terms do not necessarily describe a particular order or sequence. The objects described using these terms can be interchanged in appropriate circumstances. That is, the procedures described in the exemplary embodiments of the present disclosure could be implemented in an order other than those shown or described herein. In addition, terms such as "comprise," "include," and "have" as well as their variations are intended to cover non-exclusive inclusion. For example, a process, method, system, product, or device including a series of steps or units are not necessarily limited to the steps or units clearly listed. In some embodiments, they may include other steps or units that are not clearly listed or inherent to the process, method, product, or device.

As used herein, unless specifically stated otherwise, the term "or" encompasses all possible combinations, except where infeasible. For example, if it is stated that a device may include A or B, then, unless specifically stated otherwise or infeasible, the device may include A, or B, or A and B. As a second example, if it is stated that a device may include A, B, or C, then, unless specifically stated otherwise or infeasible, the device may include A, or B, or C, or A and B, or A and C, or B and C, or A and B and C.

Based on the several embodiments provided in the present disclosure, it should be appreciated that the disclosed technical contents may be implemented in another manner. The described apparatus, system, and method embodiments are only exemplary. For example, division of units or modules are merely exemplary division based on the logical functions. Division in another manner may exist in actual implementation. Further, a plurality of units or components may be combined or integrated into another system. Some features or components may be omitted or modified in some embodiments. In addition, the mutual coupling or direct coupling or communication connections displayed or discussed may be implemented by using some interfaces. The indirect coupling or communication connections between the units or modules may be implemented electrically or in another form.

Further, the units described as separate parts may or may not be physically separate. Parts displayed as units may or may not be physical units. They may be located in a same location or may be distributed on a plurality of network units. Some or all of the units may be selected according to actual needs to achieve the objectives of the solutions of the embodiments. In addition, functional units in the embodiments of the present disclosure may be integrated into one processing unit. Each of the units may exist alone physically, or two or more units can be integrated into one unit. The integrated unit may be implemented in a form of hardware or may be implemented in a form of a software functional unit.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

It is appreciated that the above descriptions are only exemplary embodiments provided in the present disclosure. Consistent with the present disclosure, those of ordinary skill in the art may incorporate variations and modifications in actual implementation, without departing from the principles of the present disclosure. Such variations and modifications shall all fall within the protection scope of the present disclosure.

It is appreciated that all or some of the procedures in the methods of the foregoing embodiments can be implemented by a program instructing relevant hardware components of a terminal device. The program can be stored in a computer readable storage medium. The storage medium includes a flash memory, a Read-Only Memory (ROM), a Random Access Memory (RAM), a magnetic disk, or an optical disc.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

It is appreciated that all or some of the procedures in the methods of the foregoing embodiments can be implemented by a program instructing relevant hardware components of a terminal device. The program can be stored in a computer readable storage medium. The storage medium includes a flash memory, a Read-Only Memory (ROM), a Random Access Memory (RAM), a magnetic disk, or an optical disc.

What is claimed is:

1. A method for communication by a terminal, comprising:
    sending a first data frame to a relay device, the first data frame comprising a first preamble and a first information set, and the first preamble being used to wake up the relay device;
    sending a second data frame to the relay device, the second data frame comprising a second preamble and a second information set, the second data frame being sent after the terminal has sent the first data frame and a first time interval has elapsed, and a length of the second preamble being less than that of the first preamble; and
    receiving a third data frame sent by the relay device, the third data frame being sent to the terminal after being received from a base station by the relay device.

2. The method according to claim 1, wherein the first information set comprises first time interval information of the first time interval, the first time interval information being used to indicate an information length of the first time interval.

3. The method according to claim 1, wherein the first information set comprises a security mechanism indicator, the security mechanism indicator being used to indicate a security level of the first information set.

4. The method according to claim 1, wherein the first information set comprises a count value, the count value being used to confirm that the first information set is a non-repeatedly sent message set.

5. The method according to claim 1, wherein the first information set comprises first verification information, the first verification information being used to verify the second information set.

6. The method according to claim 1, wherein the first information set comprises an encapsulation indicator, the encapsulation indicator being used to indicate whether the relay device encapsulates the second data frame.

7. The method according to claim 1, wherein the first information set comprises spreading factor indication information, the spreading factor indication information being used to instruct the relay device to send the second data frame to the base station according to a spreading factor corresponding to the spreading factor indication information.

8. The method according to claim 1, wherein the third data frame is a join-accept frame, the join-accept frame being used to accept a join request of the terminal.

9. The method according to claim 1, wherein
the second data frame is a join request frame, the join request frame being used to request to join a network.

10. The method according to claim 1, wherein after receiving the third data frame sent by the relay device, the method further comprises:
sending a fourth data frame to the relay device, the fourth data frame comprising a terminal identifier for causing the relay device to update a whitelist.

11. The method according to claim 1, wherein the terminal is configured to receive a data frame from the relay device within a relay mode receiving time window, and after receiving the third data frame sent by the relay device, the method further comprises:
determining, according to a first identifier, whether to monitor a first receiving time window and a second receiving time window, both of which being open earlier than the relay mode receiving time window.

12. The method according to claim 1, wherein the terminal is configured to receive a data frame from the relay device within a relay mode receiving time window, and the method further comprising:
in response to receiving, in a receiving time window being open earlier than the relay mode receiving time window, a fourth data frame sent by the base station, setting a frame format of a fifth data frame for sending the fifth data frame to the base station in the frame format.

13. A terminal, comprising:
a memory storing a set of instructions; and
one or more processors configured to execute the set of instructions to cause the terminal to perform:
sending a first data frame to a relay device, the first data frame comprising a first preamble and a first information set, and the first preamble being used to wake up the relay device;
sending a second data frame to the relay device, the second data frame comprising a second preamble and a second information set, the second data frame being sent after the terminal has sent the first data frame and a first time interval has elapsed, and a length of the second preamble being less than that of the first preamble; and
receiving a third data frame sent by the relay device, the third data frame being sent to the terminal after being received from a base station by the relay device.

14. A non-transitory computer readable medium that stores a set of instructions that is executable by at least one processor of a terminal to cause the terminal to perform a method for communication, the method comprising:
sending a first data frame to a relay device, the first data frame comprising a first preamble and a first information set, and the first preamble being used to wake up the relay device;
sending a second data frame to the relay device, the second data frame comprising a second preamble and a second information set, the second data frame being sent after the terminal has sent the first data frame and a first time interval has elapsed, and a length of the second preamble being less than that of the first preamble; and
receiving a third data frame sent by the relay device, the third data frame being sent to the terminal after being received from a base station by the relay device.

15. The non-transitory computer readable medium of claim 14, wherein
the first information set comprises first time interval information of the first time interval, the first time interval information being used to indicate an information length of the first time interval.

16. The non-transitory computer readable medium of claim 14, wherein
the first information set comprises a security mechanism indicator, the security mechanism indicator being used to indicate a security level of the first information set.

17. The non-transitory computer readable medium of claim 14, wherein
the first information set comprises a count value, the count value being used to confirm that the first information set is a non-repeatedly sent message set.

18. The non-transitory computer readable medium of claim 14, wherein
the first information set comprises first verification information, the first verification information being used to verify the second information set.

19. The non-transitory computer readable medium of claim 14, wherein
the first information set comprises an encapsulation indicator, the encapsulation indicator being used to indicate whether the relay device encapsulates the second data frame.

20. The non-transitory computer readable medium of claim 14, wherein
the first information set comprises spreading factor indication information, the spreading factor indication information being used to instruct the relay device to send the second data frame to the base station according to a spreading factor corresponding to the spreading factor indication information.

* * * * *